(12) United States Patent
Talwar et al.

(10) Patent No.: US 9,971,548 B1
(45) Date of Patent: May 15, 2018

(54) STORAGE RESOURCE MANAGEMENT EMPLOYING PERFORMANCE ANALYTICS

(71) Applicant: PernixData, Inc., San Jose, CA (US)

(72) Inventors: Vanish Talwar, Campbell, CA (US); Gokul Nadathur, Fremont, CA (US)

(73) Assignee: NUTANIX, INC., San Jose, CA (US)

( * ) Notice: Subject to any disclaimer, the term of this patent is extended or adjusted under 35 U.S.C. 154(b) by 0 days. days.

(21) Appl. No.: 15/451,013

(22) Filed: Mar. 6, 2017

(51) Int. Cl.
*G06F 3/06* (2006.01)

(52) U.S. Cl.
CPC ............ *G06F 3/0659* (2013.01); *G06F 3/067* (2013.01); *G06F 3/0613* (2013.01); *G06F 3/0631* (2013.01)

(58) Field of Classification Search
CPC .... G06F 3/0613; G06F 3/0631; G06F 3/0659; G06F 3/067; G06F 3/0683; G06F 2003/0697
USPC ................................ 711/154, 167, 170, 171
See application file for complete search history.

(56) References Cited

U.S. PATENT DOCUMENTS

| | | | | |
|---|---|---|---|---|
| 8,452,819 B1* | 5/2013 | Sorenson, III | ........ | G06F 3/0611 707/809 |
| 2014/0130055 A1* | 5/2014 | Guha | .................... | G06F 3/0604 718/104 |
| 2014/0156877 A1* | 6/2014 | Tylik | ..................... | G06F 3/0605 710/18 |
| 2018/0004447 A1* | 1/2018 | Oohira | .................. | G06F 3/0631 |

\* cited by examiner

*Primary Examiner* — Gary J Portka
(74) *Attorney, Agent, or Firm* — Gard & Kaslow LLP

(57) ABSTRACT

Performance of a computing system is improved by avoiding and/or eliminating overload conditions in storage systems. Performance utilization calculations are used to predict that a candidate placement configuration of storage resources within the storage systems will avoid overload conditions. The performance utilization calculations use performance profiles in conjunction with workload profiles to account for both storage system performance and actual workload traffic. Performance utilization calculations can also be used to report storage controller utilization information.

20 Claims, 7 Drawing Sheets

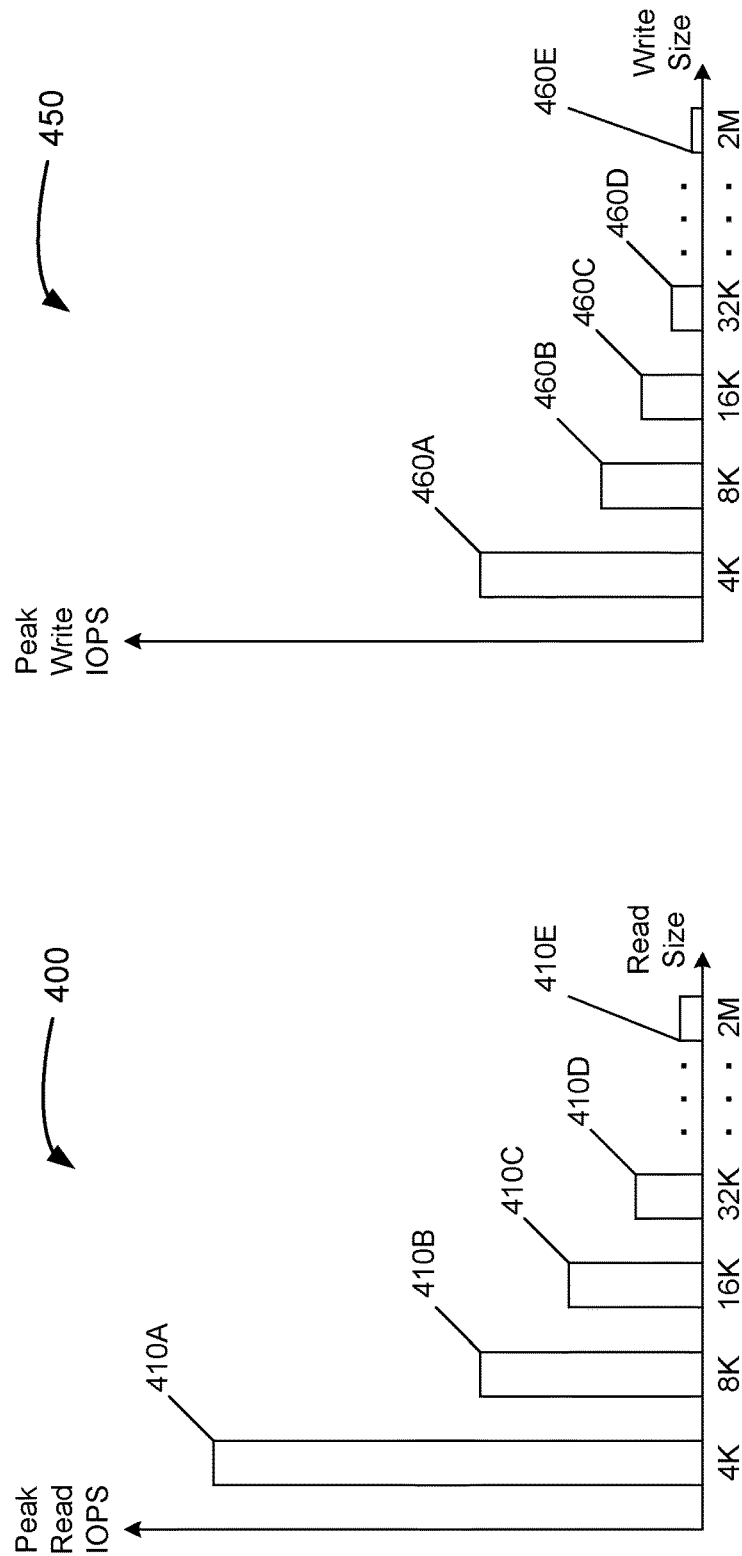

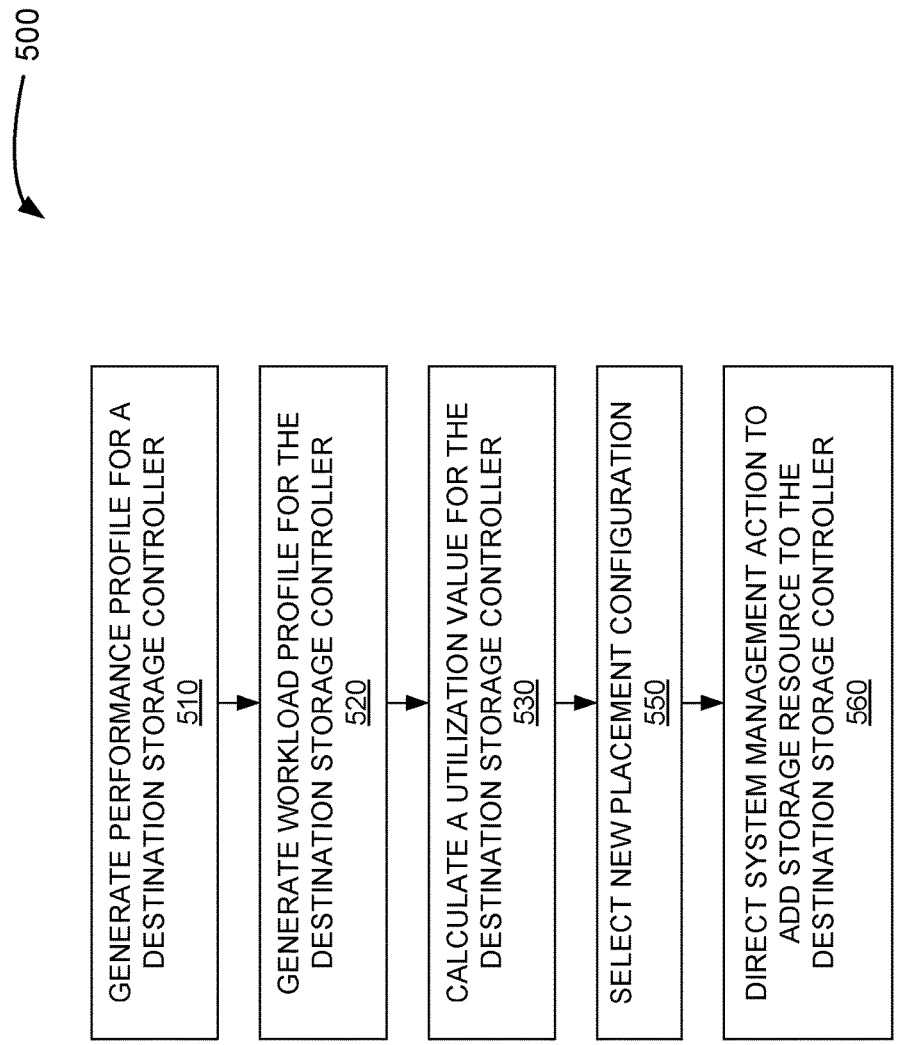

STORAGE RESOURCE MANAGEMENT EMPLOYING PERFORMANCE ANALYTICS

BACKGROUND

Field

This non-provisional U.S. patent application relates generally to storage resource management in computing systems and more specifically to those employing performance analytics.

Description of Related Art

Certain computing architectures include a set of computing systems coupled through a data network to a set of storage systems. The computing systems provide computation resources and are typically configured to execute applications within a collection of virtual machines. The storage systems are typically configured to present storage resources (e.g., storage blocks, logical unit numbers, storage volumes, file systems, etc.) to a host executing the virtual machines.

A given virtual machine can access storage resources residing on one or more storage systems thereby contributing to overall performance utilization for each storage system. Furthermore, a collection of virtual machines can present access requests that stress available performance utilization for one or more of the storage systems, leading to performance degradation. Such performance degradation can negatively impact proper execution of one or more of the virtual machines.

System operators conventionally provision different storage resources manually or automatically on available storage systems, with a general goal of avoiding performance degradation. Provisioning a storage resource typically involves allocating physical storage space within a selected storage system, creating an identity for the storage resource, and configuring a path for the identified storage resource between the storage system and a storage client. Exemplary identities include a logical unit number (LUN) and a file system universal resource locator (URL).

Conventional techniques commonly fail to address performance utilization and overutilization issues associated with the storage systems. Consequently, such techniques fail to avoid performance utilization scenarios that can stress a storage system and lead to performance degradation. What is needed therefore is an improved technique for automatically managing storage systems.

SUMMARY

According to various embodiments, a method comprising: generating by a storage resource manager a performance profile for a destination storage controller, wherein the performance profile comprises peak read input/output operations per second (IOPS) values for at least two different read input/output (I/O) request block sizes and peak write IOPS values for at least two different write I/O request block sizes; generating by the storage resource manager a workload profile for the destination storage controller, wherein the workload profile comprises contribution values for each of the at least two different read I/O request block sizes and contribution values for each of the at least two different write I/O request block sizes; calculating by the storage resource manager a performance utilization value for the destination storage controller using the performance profile and the workload profile; selecting by the storage resource manager a new placement configuration for a storage resource using the performance utilization value, wherein the new placement specifies adding the storage resource to the destination storage controller; and directing by the storage resource manager, in response to selecting the new placement configuration, the destination storage controller to perform a system management action to add the storage resource to the destination storage controller, wherein calculating the performance utilization value for the destination storage controller comprises: calculating a peak total read IOPS value according to a sum of products, wherein each product is calculated by multiplying a peak read IOPS value for each of the at least two different read I/O request block sizes by a corresponding ratio, wherein the ratio is calculated by dividing a read contribution value for the I/O request block size by a sum of read contribution values summed over a set of read I/O request block sizes; calculating a peak total write IOPS value according to a sum of products, wherein each product is calculated by multiplying a peak write IOPS value for each of the at least two different write I/O request block sizes by a corresponding ratio, wherein the ratio is calculated by dividing a write contribution value for the I/O request block size by a sum of write contribution values summed over a set of write I/O request block sizes; assigning a peak net IOPS value to be either a sum of the peak total read IOPS value and the peak total write IOPS value, or a weighted minimum of the peak total read IOPS value and the peak total write IOPS value; and calculating a ratio of total IOPS at the destination storage controller and the peak net IOPS value.

According to various further embodiments, an apparatus comprising: a computing system coupled to a storage controller, the computing system configured to: generate by a storage resource manager a performance profile for a destination storage controller, wherein the performance profile comprises peak read input/output operations per second (IOPS) values for at least two different read input/output (I/O) request block sizes and peak write IOPS values for at least two different write I/O request block sizes; generate by the storage resource manager a workload profile for the destination storage controller, wherein the workload profile comprises contribution values for each of the at least two different read I/O request block sizes and contribution values for each of the at least two different write I/O request block sizes; calculate by the storage resource manager a performance utilization value for the destination storage controller using the performance profile and the workload profile; select by the storage resource manager a new placement configuration for a storage resource using the performance utilization value, wherein the new placement specifies adding the storage resource to the destination storage controller; and direct by the storage resource manager, in response to selecting the new placement configuration, the destination storage controller to perform a system management action to add the storage resource to the destination storage controller, wherein to calculate the performance utilization value for the storage controller, the computing system is configured to: calculate a peak total read IOPS value according to a sum of products, wherein each product is calculated by multiplying a peak read IOPS value for each of the at least two different read I/O request block sizes by a corresponding ratio, wherein the ratio is calculated by dividing a read contribution value for the I/O request block size by a sum of read contribution values summed over a set of read I/O request block sizes; calculate a peak total write IOPS value according to a sum of products, wherein each product is calculated by multiplying a peak write IOPS value for each of the at least two different write I/O request block sizes by a corresponding ratio, wherein the ratio is calculated by dividing a write contribution value for the I/O request block size by a sum of write contribution values summed over a set of write I/O request block sizes; assign a peak net IOPS value to be either a sum of the peak total read IOPS value and the peak total write IOPS value, or a weighted minimum of the peak total read IOPS value and the peak total write IOPS value; and calculate a ratio of total IOPS at the storage controller and the peak net IOPS value.

According to various still further embodiments, a method comprising: generating by a storage resource manager a source performance profile for a source storage controller, wherein the source performance profile comprises source peak read input/output operations per second (IOPS) values for at least two different read input/output (I/O) request block sizes for the source storage controller and source peak write IOPS values for at least two different write I/O request block sizes for the source storage controller; generating by a storage resource manager a destination performance profile for a destination storage controller, wherein the destination performance profile comprises destination peak read IOPS values for at least two different read input/output (I/O) request block sizes for the destination storage controller and destination peak write IOPS values for at least two different write I/O request block sizes for the destination storage controller; generating by the storage resource manager a source workload profile for the source storage controller, wherein the source workload profile comprises contribution values for each of the at least two different read I/O request block sizes for the source storage controller and contribution values for each of the at least two different write I/O request block sizes for the source storage controller; generating by the storage resource manager a destination workload profile for the destination storage controller, wherein the destination workload profile comprises contribution values for each of the at least two different read I/O request block sizes for the destination storage controller and contribution values for each of the at least two different write I/O request block sizes for the destination storage controller; calculating by the storage resource manager a source performance utilization value for the source storage controller using the source performance profile and the source workload profile; and calculating by the storage resource manager a destination performance utilization value for the destination storage controller using the destination performance profile and the destination workload profile, wherein calculating the source performance utilization value for the source storage controller comprises: calculating a source peak total read IOPS value according to a first sum of products, wherein each product is calculated by multiplying a source peak read IOPS value for each of the at least two different read I/O request block sizes by a first corresponding ratio, wherein the first ratio is calculated by dividing a source read contribution value for the I/O request block size by a first sum of read contribution values summed over a first set of read I/O request block sizes; calculating a source peak total write IOPS value according to a second sum of products, wherein each product is calculated by multiplying a source peak write IOPS value for each of the at least two different write I/O request block sizes by a second corresponding ratio, wherein the second ratio is calculated by dividing a source write contribution value for the I/O request block size by a first sum of write contribution values summed over a first set of write I/O request block sizes; assigning a source peak net IOPS value to be either a sum of the source peak total read IOPS value and the source peak total write IOPS value, or a first weighted minimum of the source peak total read IOPS value and the source peak total write IOPS value; and calculating a first ratio of total IOPS at the source storage controller and the source peak net IOPS value.

According to various additional embodiments, an apparatus comprising: a computing system coupled to a storage controller, the computing system configured to: generate by a storage resource manager a source performance profile for a source storage controller, wherein the source performance profile comprises source peak read input/output operations per second (IOPS) values for at least two different read input/output (I/O) request block sizes for the source storage controller and source peak write IOPS values for at least two different write I/O request block sizes for the source storage controller; generate by a storage resource manager a destination performance profile for a destination storage controller, wherein the destination performance profile comprises destination peak read IOPS values for at least two different read input/output (I/O) request block sizes for the destination storage controller and destination peak write IOPS values for at least two different write I/O request block sizes for the destination storage controller; generate by the storage resource manager a source workload profile for the source storage controller, wherein the source workload profile comprises contribution values for each of the at least two different read I/O request block sizes for the source storage controller and contribution values for each of the at least two different write I/O request block sizes for the source storage controller; generate by the storage resource manager a destination workload profile for the destination storage controller, wherein the destination workload profile comprises contribution values for each of the at least two different read I/O request block sizes for the destination storage controller and contribution values for each of the at least two different write I/O request block sizes for the destination storage controller; calculate by the storage resource manager a source performance utilization value for the source storage controller using the source performance profile and the source workload profile; calculate by the storage resource manager a destination performance utilization value for the destination storage controller using the destination performance profile and the destination workload profile; detect by the storage resource manager an action trigger event using the source performance utilization value; select by the storage resource manager a new placement configuration for a storage resource using the destination performance utilization value, wherein the new placement specifies adding the storage resource to the destination storage controller, and wherein the destination performance utilization value is determined to not exceed a predetermined threshold for the destination storage controller; and direct by the storage resource manager, in response to selecting the new placement configuration, the destination storage controller to perform a system management action to add the storage resource to the destination storage controller, wherein to calculate the source performance utilization value for the source storage controller, the computing system is configured to: calculate a source peak total read IOPS value according to a first sum of products, wherein each product is calculated by multiplying a source peak read IOPS value for each of the at least two different read I/O request block sizes by a first corresponding ratio, wherein the first ratio is calculated by dividing a source read contribution value for the I/O request block size by a first sum of read contribution values summed over a first set of read I/O request block sizes; calculate a source peak total write IOPS value according to a second sum of products, wherein each product is calculated by multiplying a source peak write IOPS value for each of the at least two different write I/O request block sizes by a second corresponding ratio, wherein the second ratio is calculated by dividing a source write contribution value for the I/O request block size by a first sum of write contribution values summed over a first set of write I/O request block sizes; assign a source peak net IOPS value to be either a sum of the source peak total read IOPS value and the source peak total write IOPS value, or a first weighted minimum of the source peak total read IOPS value and the source peak total write IOPS value; and calculate a first ratio of total IOPS at the source storage controller and the source peak net IOPS value.

BRIEF DESCRIPTION OF THE DRAWINGS

FIG. 4A illustrates a graph of peak input/output operations per second for read requests as a function of input/output request block size for an exemplary storage system, according to some embodiments.

FIG. 4B illustrates a graph of peak input/output operations per second for write requests as a function of input/output request block size for an exemplary storage system, according to some embodiments.

FIG. 5 is a flow chart of a method for directing a system management action using a performance utilization estimate for a destination storage controller, according to some embodiments.

DETAILED DESCRIPTION

Figure 1:
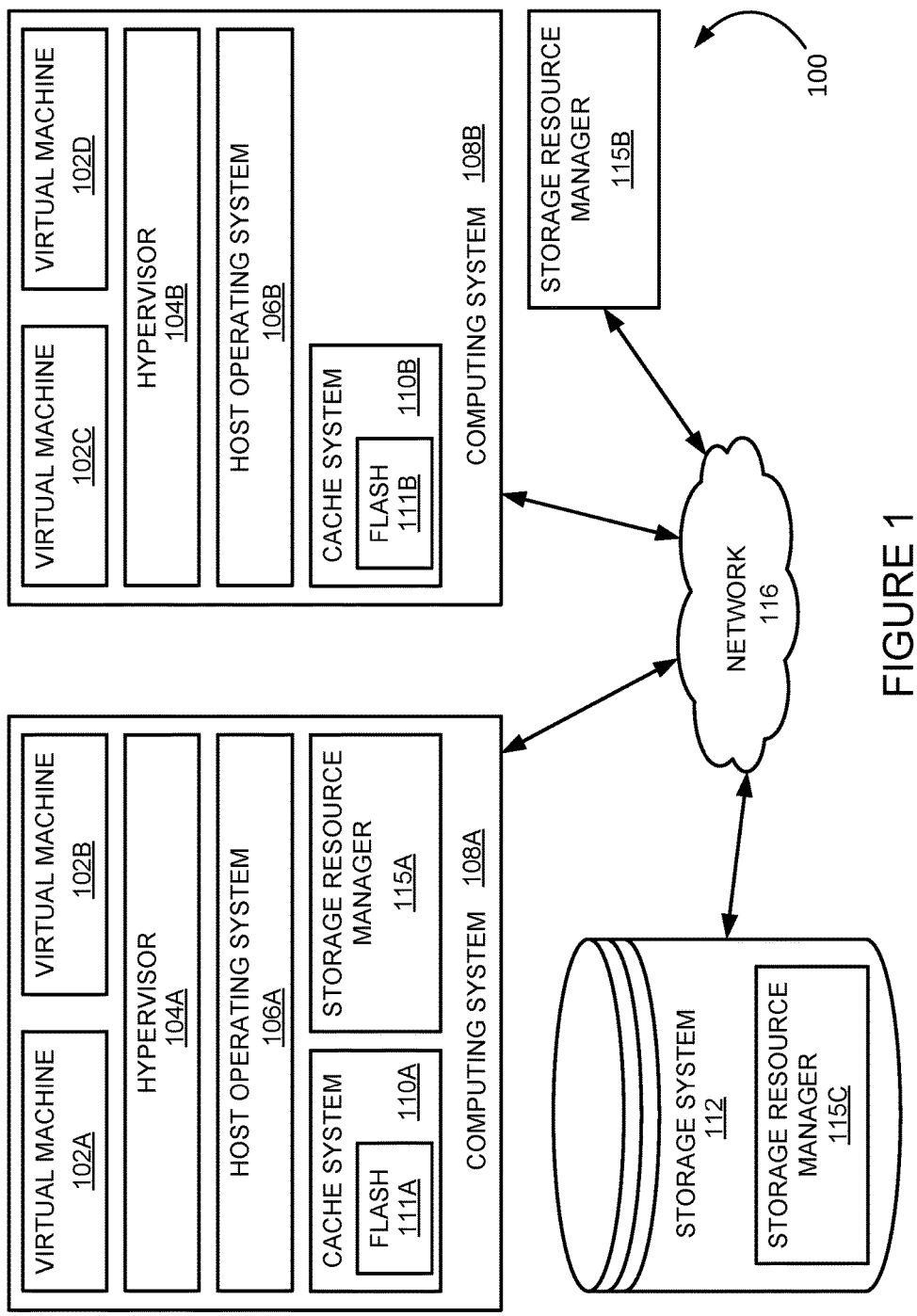
FIG. 1 is a block diagram of a portion of a computing system operating environment in which various embodiments can be practiced.

In typical system architectures, computing systems can generate more workload (i.e., read and/or write requests per second) for a storage system than the storage system can service, resulting in an overload condition for the storage system.

Techniques for performance analytics disclosed herein improve computer system operation by selecting placement of storage resources within storage systems to prevent or avoid overload conditions. The techniques can be applied in predictive usage cases for provisioning a new storage resource and reactive usage cases for migrating a currently provisioned storage resource. A storage resource can be, without limitation, a logical unit number (LUN) and a storage volume. In one embodiment, a LUN is a sequentially referenced set of storage blocks and a storage volume is a set of storage blocks organized according to a specific structure, such as a file system. A particular collection of specified locations of storage resources within a set of storage systems is referred to herein as a placement configuration. The techniques define a set of predictive performance analytics for estimating performance utilization of the storage systems prior to actually implementing a candidate placement configuration and any provisioning thereof. The performance utilization estimate is then used by the techniques to select a new placement configuration (either for provisioning a new storage resource or migrating a current storage resource) from a set of candidate placement configurations that avoids overloading the storage systems. An action trigger event initiates a process of selecting and implementing a new placement configuration. Exemplary trigger events include detecting that a storage system is overloaded or in danger of being overloaded, receiving a request to provision a new storage resource, and determining that at least one storage resource meets conditions to be migrated from one storage system to a different storage system. These and other trigger events are described in greater detail herein.

For example, what-if and headroom analysis can be performed to evaluate different candidate placement configurations for new storage resources by calculating what would be new performance utilization values of various storage systems specified in the candidate placement configurations. Similarly, prior to migrating a currently provisioned storage resource, performance utilization calculations can be performed to predict which storage system can best accommodate the storage resource while satisfying existing workloads.

Further, in various embodiments, different candidate placement configurations are evaluated with respect to current performance utilization of the storage systems, and a given candidate placement configuration is evaluated to be acceptable if the storage systems are not overloaded in the candidate placement configuration. Any technique known in the art can be implemented to generate a candidate placement configuration.

In various embodiments, performance utilization is calculated according to various equations described herein. Performance utilization calculations operate on a workload profile of access requests serviced within a measurement time period and a performance profile for storage systems configured to service the access requests. The workload profile separately includes a contribution value (e.g., count, normalized contribution, etc.) for each of two or more different read input/output (I/O) request block sizes (e.g., block size) and a contribution value for each of two or more different write I/O request block sizes. The performance profile specifies the ability of the storage system to service read and write requests of different I/O request block sizes.

FIG. 1 is a block diagram of a portion of an environment 100 in which various embodiments can be practiced. Referring first to computing system 108A on the left, the environment 100 comprises one or more virtual machines 102 (denoted 102A & 102B in the figure, and wherein each virtual machine can itself be considered an application) executed by a hypervisor 104A. The hypervisor 104A is executed by a host operating system 106A (which may itself include the hypervisor 104A) or may execute in place of the host operating system 106A. The host operating system 106A resides on the physical computing system 108A having a cache system 110A. The cache system 110A includes operating logic to cache data within a local memory). The local memory is a faster, more expensive memory such as Dynamic Random Access Memory (DRAM) or persistent devices such as flash memory 111A. The environment 100 can include multiple computing systems 108, as is indicated in the figure by computing system 108A and computing system 108B. Each of computing system 108A and 108B is configured to communicate across a network 116 with a storage system 112 to store data. Network 116 is any known communications network including a local area network, a wide area network, a proprietary network or the Internet. The storage system 112 is a slower memory device such as a Solid State Drive (SSD) or hard disk. The environment 100 can include multiple storage systems 112. Examples of storage system 112 include, but are not limited to, a storage area network (SAN), a local disk, a shared serial attached "small computer system interface (SCSI)" (SAS) box, a network file system (NFS), a network attached storage (NAS), an internet SCSI (iSCSI) storage system, and a Fibre Channel storage system.

Referring to either of computing system 108A or 108B, when a virtual machine 102 generates a read command or a write command, the application sends the generated command to the host operating system 106. The virtual machine 102 includes, in the generated command, an instruction to read or write a data record at a specified location in the storage system 112. When activated, cache system 110 receives the sent command and caches the data record and the specified storage system memory location. As understood by one of skill in the art, in a write-through cache system, the generated write commands are simultaneously sent to the storage system 112. Conversely, in a write-back cache system, the generated write commands are subsequently sent to the storage system 112 typically using what is referred to herein as a destager.

In some embodiments of the present approach, and as would be understood by one of skill in the art in light of the teachings herein, the environment 100 of FIG. 1 can be further simplified to being a computing system running an operating system running one or more applications that communicate directly or indirectly with the storage system 112.

As stated above, cache system 110 includes various cache resources. In particular and as shown in the figure, cache system 110 includes a flash memory resource 111 (e.g., 111A and 111B in the figure) for storing cached data records. Further, cache system 110 also includes network resources for communicating across network 116.

Such cache resources are used by cache system 110 to facilitate normal cache operations. For example, virtual machine 102A may generate a read command for a data record stored in storage system 112. As has been explained and as understood by one of skill in the art, the data record is received by cache system 110A. Cache system 110A may determine that the data record to be read is not in flash memory 111A (known as a "cache miss") and therefore issue a read command across network 116 to storage system 112. Storage system 112 reads the requested data record and returns it as a response communicated back across network 116 to cache system 110A. Cache system 110A then returns the read data record to virtual machine 102A and also writes or stores it in flash memory 111A (in what is referred to herein as a "false write" because it is a write to cache memory initiated by a generated read command versus a write to cache memory initiated by a generated write command which is sometimes referred to herein as a "true write" to differentiate it from a false write).

Having now stored the data record in flash memory 111A, cache system 110A can, following typical cache operations, now provide that data record in a more expeditious manner for a subsequent read of that data record. For example, should virtual machine 102A, or virtual machine 102B for that matter, generate another read command for that same data record, cache system 110A can merely read that data record from flash memory 111A and return it to the requesting virtual machine rather than having to take the time to issue a read across network 116 to storage system 112, which is known to typically take longer than simply reading from local flash memory.

Likewise, as would be understood by one of skill in the art in light of the teachings herein, virtual machine 102A can generate a write command for a data record stored in storage system 112 which write command can result in cache system 110A writing or storing the data record in flash memory 111A and in storage system 112 using either a write-through or write-back cache approach.

Still further, in addition to reading from and/or writing to flash memory 111A, in some embodiments cache system 110A can also read from and/or write to flash memory 111B and, likewise, cache system 110B can read from and/or write to flash memory 111B as well as flash memory 111A in what is referred to herein as a distributed cache memory system. Of course, such operations require communicating across network 116 because these components are part of physically separate computing systems, namely computing systems 108A and 108B.

In one embodiment, a storage resource manager 115A is configured to generate performance utilization values for one or more storage systems 112 and perform system management actions according to the performance utilization values. The resource manager 115A can be implemented in a variety of ways known to those skilled in the art including, but not limited to, as a software module executing within computing system 108A. The software module may execute within an application space for host operating system 106A, a kernel space for host operating system 106A, or a combination thereof. Similarly, storage resource manager 115A may instead execute as an application within a virtual machine 102. In another embodiment, storage resource manager 115A is replaced with storage resource manager 115B, configured to execute in a computing system that is independent of computing systems 108A and 108B. In yet another embodiment, storage resource manager 115A is replaced with a storage resource manager 115C configured to execute within a storage system 112.

In one embodiment, a storage system manager 115 includes three sub-modules. A first of the three sub-modules is a data collection system, configured to provide raw usage statistics data for usage of the storage system. For example, the raw usage statistics data can include input/output operations per second (IOPS) performed for read and write I/O request block sizes and workload profiles (accumulated I/O request block size distributions). In one embodiment, a portion of the first sub-module is configured to execute within storage system 112 to collect raw usage statistics related to storage resource usage, and a second portion of the first sub-module is configured to execute within computing systems 108 to collect raw usage statistics related to virtual machine resource usage. The second sub-module is configured to calculate performance utilization, such as performance utilization of the storage system. In one embodiment the second sub-module is implemented to execute within a computing system 108 (within storage resource manager 115A), an independent computing system (within storage resource manager 115B) or within storage system 112 (within storage resource manager 115C). The third sub-module is configured to receive performance utilization output results of the second sub-module, and to respond to the utilization output results by directing a system management action as described further elsewhere herein.

Figure 2:
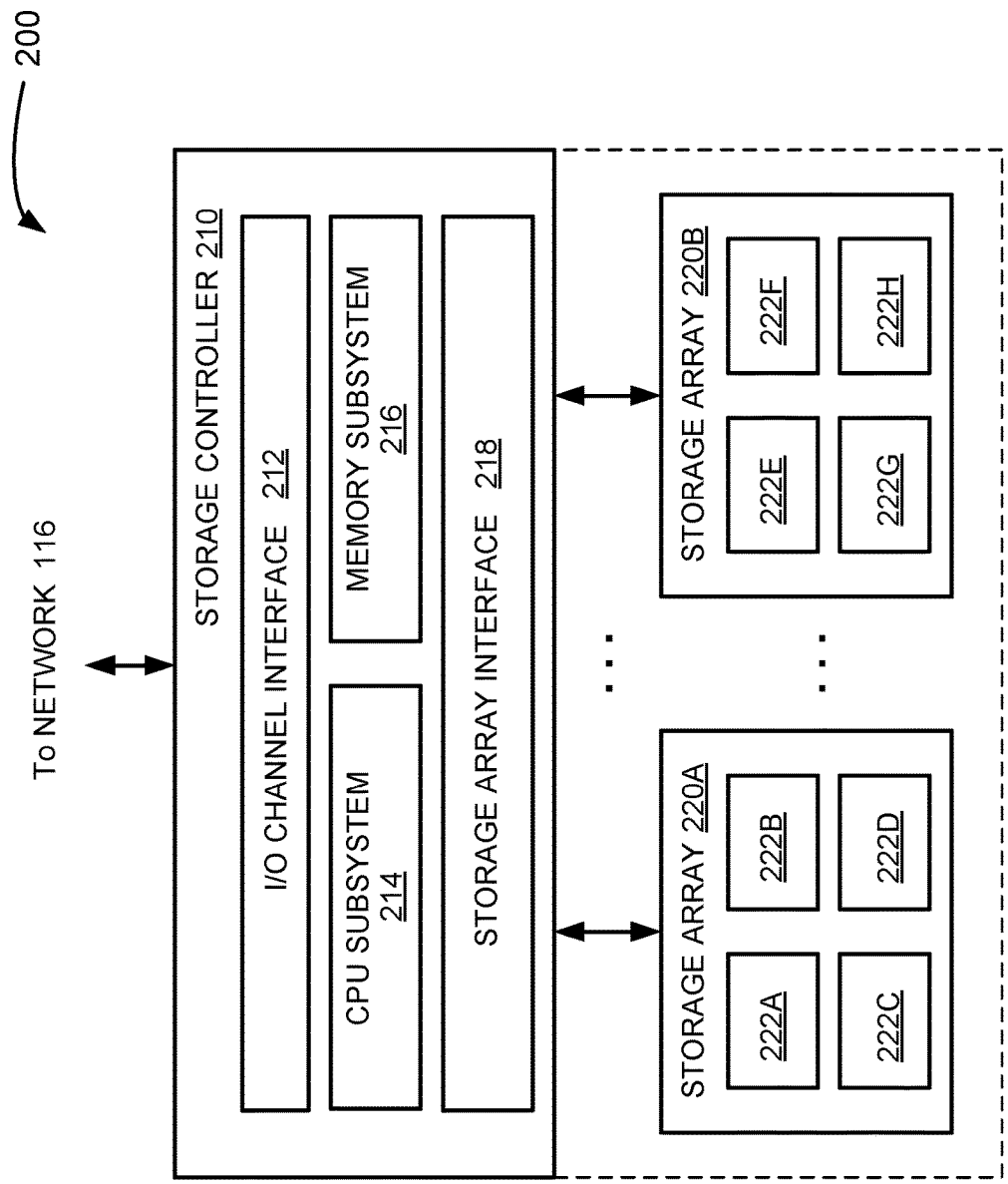
FIG. 2 is a block diagram of an exemplary storage system in which various embodiments can be practiced.

FIG. 2 is a block diagram of an exemplary storage system 200 in which various embodiments can be practiced. In one embodiment, storage system 112 of FIG. 1 includes at least one instance of storage system 200. As shown, storage system 200 comprises a storage controller 210 and one or more storage array 220 (e.g., storage arrays 220A and 220B). Storage controller 210 is configured to provide read and write access to target storage resources 222 residing within a storage array 220. In one embodiment, storage controller 210 includes an input/output (I/O) channel interface 212, a central processing unit (CPU) subsystem 214, a memory subsystem 216, and a storage array interface 218. In certain embodiments, storage controller 210 is configured to include one or more storage arrays 220 within an integrated system. In other embodiments, storage arrays 220 are discrete systems coupled to storage controller 210.

In one embodiment, I/O channel interface 212 is configured to communicate with network 116. CPU subsystem 214 includes one or more processor cores, each configured to execute instructions for system operation such as performing read and write access requests to storage arrays 220. A memory subsystem 216 is coupled to CPU subsystem 214 and configured to store data and programming instructions. In certain embodiments, memory subsystem 216 is coupled to I/O channel interface 212 and storage array interface 218, and configured to store data in transit between a storage array 220 and network 116. Storage array interface 218 is configured to provide media-specific interfaces (e.g., SAS, SATA, etc.) to storage arrays 220.

Storage controller 210 accumulates raw usage statistics data and transmits the raw usage statistics data to a storage resource manager, such as storage resource manager 115A, 115B, or 115C of FIG. 1. In particular, the raw usage statistics data can include independent IOPS values for different read requests sizes and different write I/O request block sizes. A given mix of different read I/O request block sizes and different write I/O request block sizes accumulated during a measurement time period characterizes a workload presented to storage system 200. In one embodiment, the storage resource manager processes the raw usage statistics data to generate a workload profile for the storage controller. A performance profile for storage system 200 is generated using peak IOPS values calculated using the raw usage statistics data.

In one embodiment, the workload profile includes aggregated access requests generated by a collection of one or more storage clients directing requests to various storage resources residing within storage system 200. Exemplary storage clients include, without limitation, virtual machines 102. As the number of storage clients increases and the number of requests from the storage clients increases, the workload for storage system 200 can increase beyond the ability of storage system 200 to service the workload, which is an overload condition that results in performance degradation that can impact multiple storage clients.

System operation is improved by locating and/or relocating storage resources among different instances of storage system 200. Prior to locating or relocating a storage resource, candidate placement configurations for the storage resources are evaluated according to performance utilization values computed as though the storage resources were configured in the candidate placement configurations. Performance utilization is used as a primary metric in evaluating different placement configurations (e.g., candidate placement configurations). Techniques for computing performance utilization are disclosed herein.

Figure 3:
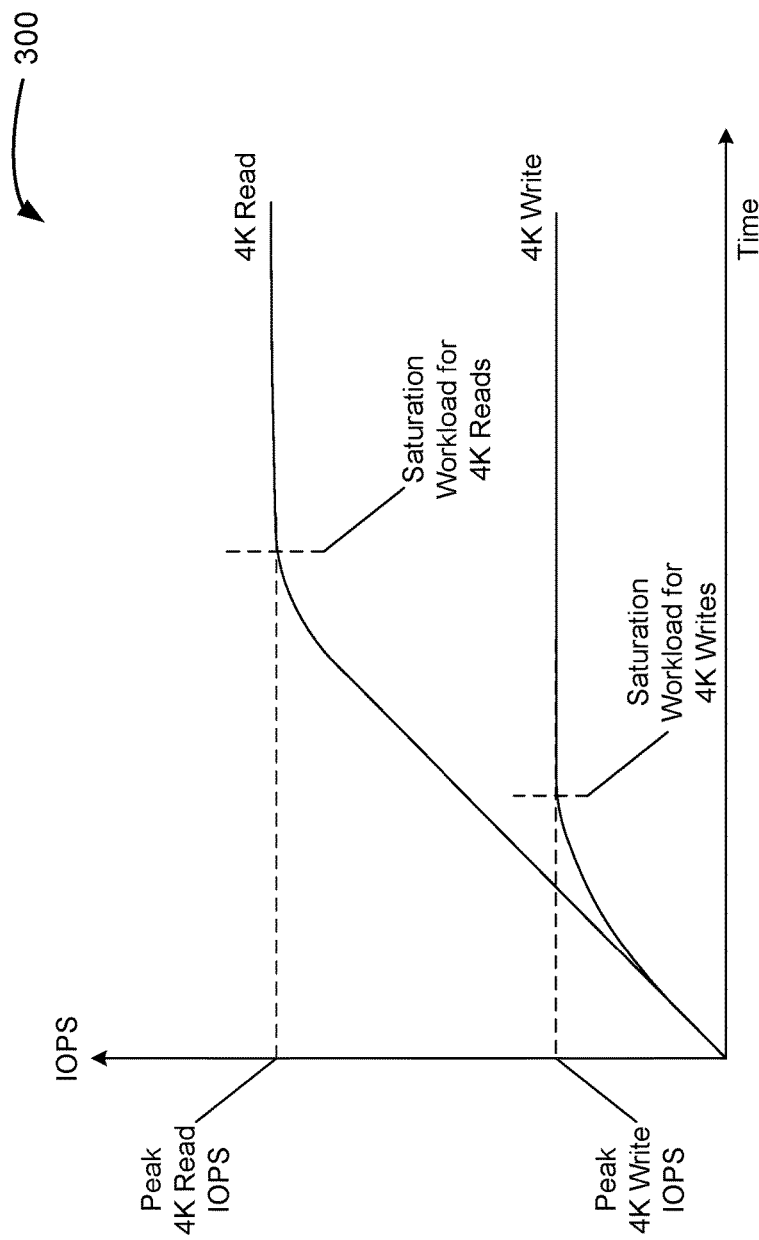
FIG. 3 illustrates an exemplary graph of input/output operations per second for four-kilobyte (4K) read and 4K write requests over time to the storage system, according to some embodiments.

As stated previously, performance utilization is a function of both a workload profile and a performance profile of a storage system. The performance profile of the system characterizes the ability of a given storage system 200 to service read requests for each different read I/O request block size and write requests for each different write I/O request block size. For each read and write I/O request block size, storage system 200 exhibits a separate peak IOPS value. FIG. 3 illustrates the concept of a peak IOPS value for a given I/O request block size. FIGS. 4A and 4B illustrate sets of peak IOPS values comprising a performance profile.

FIG. 3 illustrates an exemplary graph 300 of IOPS for 4K read and 4K write requests over time to the storage system (e.g., storage system 200), according to some embodiments. As workload increases are sustained over time, IOPS achieved by the storage system increases and tracks the workload. However, at a saturation workload the storage system is servicing as many requests as possible (saturated) and is unable to service any more requests. At this point, the storage system is operating at a peak IOPS value. Storage system saturation is evident as a flattening of each plot of IOPS, as shown.

A given storage system can have different saturation workloads and peak IOPS values for different I/O request block sizes. Furthermore, certain types of storage media, such as flash memory, have longer write times compared to read times. Consequently, the storage system may have a lower peak IOPS value for writes compared to a peak IOPS value for reads. While only peak IOPS values are shown for 4K reads and writes, a complete performance profile includes a peak IOPS value for each valid read I/O request block size and each valid write I/O request block size.

In general, a given storage system 200 will include specific design and implementation details, and will consequently exhibit a repeatable saturation load and peak IOPS value for each different read and write I/O request block size comprising a performance profile.

FIG. 4A is a graph 400 of peak IOPS values 410 for read requests as a function of I/O request block size for an exemplary storage system (e.g. storage system 200), according to some embodiments. Peak IOPS values 410 for different I/O request block sizes are depicted, with each peak IOPS value 410 measured according to only read traffic of the I/O request block size. For example, a peak 4K IOPS value 410A is measured with only 4K read requests to the storage system. A peak 8K IOPS value 410B is measured with only 8K read requests. Similarly, peak IOPS values 410C, 410D, 410E are measured for 16K, 32K, and 2M read requests. I/O request block sizes between 32K and 2M are not shown here for the purpose of clarity; however, in various embodiments, a peak IOPS value for each valid I/O request block size is measured.

FIG. 4B is a graph 450 of peak IOPS for write requests as a function of I/O request block size for the exemplary storage system, according to some embodiments. As shown, peak IOPS values 460 for different I/O request block sizes are show, with each peak IOPS value measured according to only write traffic for the I/O request block size. I/O request block sizes between 32K and 2M are not shown here for the purpose of clarity; however, in various embodiments, a peak IOPS value for each valid I/O request block size is measured.

In various embodiments, storage resources are provisioned and/or migrated to storage systems according to an evaluation of different candidate placement configurations with a goal of avoiding overloading a storage system. As is understood in the art, migrating a storage resource involves relocating data and identity (e.g., a LUN or URL) for the storage resource from one physical (or logical) system to a different system. In the context of the present disclosure, migrating a storage resource involves copying data comprising the storage resource from a first storage controller to a second storage controller. In one embodiment, migrating a storage resource specifically involves copying the data from one storage array 220 to a different storage array 220. As is known in the art, migrating can proceed over an arbitrary time span, and may proceed while the storage resource is being actively accessed by storage clients.

A performance utilization value is estimated for candidate placement configurations within a set of candidate placement configurations. In one embodiment, a candidate placement configuration is evaluated as acceptable if no storage system performance utilization is estimated to be above a predefined overload threshold. In one embodiment, the predefined overload threshold for a given storage system is specified to be ninety percent of the performance utilization as defined herein. Different storage systems in a candidate placement configuration can have different absolute performance capacities, and each predefined overload threshold of ninety percent is inherently scaled by the calculations for performance utilization disclosed herein. Additional metrics can also be included in evaluation of a candidate placement configuration. For example, total and allocated storage capacity of a storage system can be used to evaluate whether locating a given storage resource at a storage system is acceptable. If locating the storage resource at the storage system would increase allocated capacity above a maximum capacity threshold (e.g. ninety percent), then the candidate placement configuration is not acceptable.

The present technique for estimating performance utilization will now be discussed in detail in the context of EQUATIONS 1-42. Peak read IOPS values (e.g., as depicted in FIG. 4A) are referred to herein as rmax(4k), rmax(8k) . . . rmax(2M) for I/O request block sizes of 4K, 8K, and so forth through 2 MB, respectively. Similarly, peak write IOPS values (e.g., as depicted in FIG. 4B) are referred to herein as wmax(4K), wmax(8K) . . . wmax(2M) for I/O request block sizes of 4K, 8K, and so forth through 2M, respectively. In one embodiment, a performance profile comprises a vector of two or more rmax values and a vector of two or more wmax values.

In various embodiments, different forms of performance utilization are calculated according to EQUATIONS 1-42. Performance utilization is calculated in certain embodiments with respect to a storage controller (e.g. storage controller 210) because storage controller performance utilization is a determining factor in overall system performance. More specifically, overall performance utilization for a storage controller is calculated according to EQUATIONS 1-14; performance utilization of a storage controller from a workload targeting a specific storage resource is calculated according to EQUATIONS 15-21; performance utilization of a storage controller from a workload initiated from a specific virtual machine is calculated according to EQUATIONS 22-32; and performance utilization of a storage controller initiated from a specific virtual machine and targeting a specific storage resource is calculated according to EQUATIONS 33-42.

An overall performance utilization value for a storage controller (storage controller performance utilization) is calculated according to EQUATIONS 1-14. A given workload associated with a particular storage resource or a particular storage controller can be either a dependent workload or an independent workload. A dependent workload has a shared bottleneck (or other dependency correlation) between read and write requests. For example, in one embodiment storage controller 210 includes a front-end storage tier (not shown) that is configured to absorb transient surges in write requests targeting storage arrays 220. This front-end storage tier can use fast storage devices such as non-volatile random-access memory (NVRAM) and/or non-volatile memory express (NVMe) based devices. The write requests are destaged to a backend storage tier in the storage arrays 220 over time. The backend storage tier can use larger capacity solid-state drives (SSDs). The front-end storage tier holds the most recent version of resident data blocks, so read requests to those resident data blocks are served by the front-end storage tier. In such an embodiment, write requests and read requests compete for access to the front-end storage tier and are therefore dependent in nature, sharing the front-end storage tier as a common bottleneck. An independent workload has effectively no correlation between read requests and write requests. For example, in a system with the front-end storage tier described herein to absorb write requests, read requests that target blocks residing in the backend storage tier in the storage arrays 220 (rather than resident in the front-end storage tier) do not compete for access to the front-end storage tier and are therefore effectively independent.

EQUATIONS 1 and 6 calculate a peak total read IOPS value including all I/O request block sizes as a sum of products over a range of I/O request block sizes, wherein each product is calculated by multiplying a peak read IOPS value specified for a read I/O request block size rmax(n) by a ratio r(n) of read IOPS value for the I/O request block size divided by a total read IOPS value for a set of read I/O request block sizes. EQUATIONS 3 and 8 calculate a peak total write IOPS value including all I/O request block sizes as a sum of products over a range of I/O request block sizes, wherein each product is calculated by multiplying a peak write IOPS value specified for a write I/O request block size wmax(n) by a ratio w(n) of write IOPS value for the I/O request block size divided by a total write IOPS value for a set of valid I/O request block sizes.

For dependent workloads, the peak read IOPS value $rmax_{dep}$ for a given workload is computed according to EQUATIONS 1 and 2. The expression $\forall n=[4K \ldots 2M]$ indicates that index variable n is assigned each member of the set "4K . . . 2M" for the summation operator.

$$rmax_{dep} = \sum_{n=4K}^{2M} r(n) * rmax(n) \; \forall \, n = [4K \ldots 2M] \quad (1)$$

$$r(n) = \frac{Ir(n)}{I} \quad (2)$$

In EQUATION 1, r(n) is a ratio of read IOPS (Ir(n)) for I/O request block size n to the total IOPS at the storage controller (I). This ratio is calculated in EQUATION 2.

Similarly, a peak write IOPS value $wmax_{dep}$ for a given dependent workload is computed according to EQUATIONS 3 and 4.

$$vmax_{dep} = \sum_{n=4K}^{2M} w(n) * wmax(n) \; \forall \, n = [4K \ldots 2M] \quad (3)$$

$$w(n) = \frac{Iw(n)}{I} \quad (4)$$

In EQUATION 3, w(n) is a ratio of write IOPS (Iw(n)) for I/O request block size n to the total IOPS at the storage controller (I). This ratio is calculated in EQUATION 4. Total peak IOPS for dependent workloads $Imax_{dep}$ is expressed as the sum of the peak read IOPS value added to the peak write IOPS value. This sum is calculated in EQUATION 5.

$$Imax_{dep} = rmax_{dep} + wmax_{dep}. \quad (5)$$

For independent workloads, the peak read IOPS value $rmax_{ro}$ for a given workload is computed according to EQUATION 6.

$$rmax_{ro} = \sum_{n=4K}^{2M} r(n) * rmax(n) \; \forall \, n = [4K \ldots 2M] \quad (6)$$

$$r(n) = \frac{Ir(n)}{I_r} \quad (7)$$

In EQUATION 6, r(n) is a ratio of read IOPS (Ir(n)) for I/O request block size n to the total read IOPS at the storage controller (Ir). This ratio is calculated in EQUATION 7.

Similarly, a peak write IOPS value for a given independent workload is computed according to EQUATION 8.

$$wmax_{wo} = \sum_{n=4K}^{2M} w(n) * wmax(n) \; \forall \, n = [4K \ldots 2M] \quad (8)$$

$$w(n) = \frac{Iw(n)}{I_w} \quad (9)$$

In EQUATION 8, w(n) is a ratio of write IOPS (Iw(n)) for I/O request block size n to the total write IOPS at the storage controller (Iw). This ratio is calculated in EQUATION 9.

Total peak IOPS for independent workloads $Imax_{indep}$ is calculated in EQUATION 10, which describes selecting a weighted minimum of a peak total read IOPS value and a peak total write IOPS value.

$$Imax_{indep} = \min\left(\frac{rmax_{ro}}{I_r} * I, \frac{wmax_{wo}}{I_w} * I\right) \quad (10)$$

In one embodiment, read performance utilization ($U_R$) for independent workloads is calculated according EQUATION 11, which specifies a ratio of a read IOPS value (Ir) to a total independent IOPS value $Imax_{indep}$. Furthermore, write performance utilization ($U_W$) for independent workloads is computed according to EQUATION 12, which specifies a ratio of a write IOPS value to the total independent IOPS value $Imax_{indep}$.

$$U_R = \frac{I_r}{Imax_{indep}} \quad (11)$$

$$U_W = \frac{I_w}{Imax_{indep}} \quad (12)$$

In one embodiment, a peak IOPS value is calculated according to EQUATION 13, which calculates a peak overall IOPS value $I_{max}$ as a minimum of the peak dependent IOPS value and the peak independent IOPS value. The peak dependent IOPS value is associated with dependent workloads and the independent peak IOPS value is associated with independent workloads. An overall storage controller performance utilization value ($U_C$) for the storage controller is then calculated according to a ratio, as shown in EQUATION 14.

$$I_{max} = \min(Imax_{dep}, Imax_{indep}) \quad (13)$$

$$U_C = \frac{I}{Imax} \quad (14)$$

In EQUATION 14, storage controller performance utilization ($U_C$) is calculated according to a ratio of a total IOPS value (I) to the peak number of IOPS (Imax), given a specific workload profile and a performance profile. The storage controller performance utilization $U_C$ indicates a portion of a peak total IOPS value, given a prevailing workload and workload profile. The storage controller performance utilization ($U_C$) scales from a value of zero when there is no workload to a value of one when the workload is at a saturation level for a corresponding storage controller. The storage controller performance utilization ($U_C$) accounts for a prevailing mix of read and write I/O request block sizes and the contribution to performance utilization for each.

Workload can increase or decrease depending on storage client activity, and therefore a given storage controller performance utilization estimate has potential to increase or decrease over time. Overloading can be predicted and substantially avoided by placing storage resources among storage controllers in a placement configuration that keeps estimated controller performance utilization below a predefined threshold (e.g., overload threshold). The threshold provides a safety margin to accommodate increases in workload. In particular, EQUATIONS 1-14 provide appropriate calculations to estimate storage controller performance utilization ($U_C$) used to evaluate individual storage controller performance utilization in the context of candidate placement configuration evaluations prior to placing or migrating storage resource.

A performance utilization value for a storage controller that is attributed to a storage resource (storage resource performance utilization) is calculated according to EQUATIONS 15-21. Storage resource performance utilization is calculated for a given storage resource s accessed through a storage controller c. A total IOPS value Is is attributed to accesses targeting the storage resource s, and a weight Ws is calculated as a portion of accesses targeting the storage resource relative to other accesses targeting the same storage controller. Storage resource performance utilization Us(c) estimates a portion of workload for storage controller c that is specifically attributed to storage resource s.

In certain embodiments, storage resource performance utilization is calculated similarly to the techniques described herein regarding EQUATIONS 1-14, with modifications discussed below with reference to EQUATIONS 15-21. In particular, EQUATION 15 parallels the calculation of EQUATIONS 1 and 6, and EQUATION 17 parallels the calculation of EQUATIONS 3 and 8. EQUATION 16 is similar to EQUATION 7 in form, but differs in that the ratio is calculated as read IOPS for a given size n over total IOPS for the storage resource s. EQUATION 18 is similar to EQUATION 9 in form, but differs in that the ratio is calculated as write IOPS for a given size n over total IOPS for the storage resource s. A value for storage resource performance utilization Us is calculated in EQUATION 19. A value for storage resource performance utilization Us(c) for a particular storage controller c is calculated in EQUATION 21.

$$rmax = \sum_{n=4K}^{2M} r(n) * rmax(n) \ \forall \ n = [4K \ ... \ 2M] \tag{15}$$

$$r(n) = \frac{Ir(n)}{Is} \tag{16}$$

$$wmax = \sum_{n=4K}^{2M} w(n) * wmax(n) \ \forall \ n = [4K \ ... \ 2M] \tag{17}$$

$$w(n) = \frac{Iw(n)}{Is} \tag{18}$$

$$U_s = \frac{I_s}{rmax + wmax} \tag{19}$$

$$W_s = \frac{U_s}{\sum_{s=s0}^{sn} U_s} \tag{20}$$

$$U_s(c) = W_s * U_c \tag{21}$$

A performance utilization value for a storage controller that is attributed to a virtual machine (virtual machine performance utilization) is calculated according to EQUATIONS 22-32. Virtual machine performance utilization is calculated for a given virtual machine v accessing storage controller c. In a first embodiment, a workload profile for the virtual machine is available and the virtual machine performance utilization is calculated according to EQUATIONS 22-25 and 30-32. In a second embodiment, the workload profile for the virtual machine is not available and the virtual machine performance utilization is calculated according to EQUATIONS 26-29 and 30-32. In one embodiment, a given virtual machine v corresponds to a virtual machine 102 of FIG. 1.

In certain embodiments, virtual machine performance utilization is calculated similarly to the techniques described herein regarding EQUATIONS 1-14, with modifications discussed herein with reference to EQUATIONS 22-32. In particular, EQUATION 22 parallels the calculation of EQUATIONS 1 and 6, and EQUATION 24 parallels the calculation of EQUATIONS 3 and 8. EQUATION 23 is similar to EQUATION 7 in form, but differs in that the ratio is calculated as read IOPS initiated by virtual machine v, of a given size n, accessing storage controller c divided by total IOPS for the virtual machine v accessing storage controller c. EQUATION 25 is similar to EQUATION 9 in form, but differs in that the ratio is calculated as write IOPS initiated by virtual machine v, of a given size n, accessing storage controller c divided by total IOPS for the virtual machine v accessing storage controller c.

A value for virtual machine performance utilization Uv is calculated in EQUATION 30 as the ratio of total IOPS for virtual machine v accessing storage controller c divided by a sum of peak read IOPS values and peak write IOPS values. This virtual machine performance utilization Uv can be calculated when a workload profile for the virtual machine is available. When the workload profile for the virtual machine is not available, a variation of the value for virtual machine performance utilization Uv(c) is calculated in EQUATION 32 for virtual machine v accessing storage controller c. The term $U_C$ is a storage controller performance utilization (e.g., as calculated in EQUATION 14).

In one embodiment a specific workload profile is available for a given virtual machine v, and rmax and wmax are calculated according to EQUATIONS 22-25.

$$rmax = \sum_{n=4K}^{2M} r(n) * rmax(n) \ \forall \ n = [4K \ ... \ 2M] \tag{22}$$

$$r(n) = \frac{Iv(c)(r)(n)}{Iv(c)} \tag{23}$$

$$wmax = \sum_{n=4K}^{2M} w(n) * wmax(n) \ \forall \ n = [4K \ ... \ 2M] \tag{24}$$

$$w(n) = \frac{Iv(c)(w)(n)}{Iv(c)} \tag{25}$$

In an alternative embodiment, a specific workload profile is not available for the virtual machine v, and an average I/O request block size for the virtual machine is instead used to calculate rmax and wmax, according to EQUATIONS 26-29.

$$rmax = r * rmax(rb) \tag{26}$$

$$r = \frac{Iv(c)(r)}{Iv(c)} \tag{27}$$

$$wmax = w * wmax(wb) \tag{28}$$

$$w = \frac{Iv(n)(w)}{Iv(c)} \tag{29}$$

The terms rb and wb represent respective average read and write I/O request block sizes generated by virtual machine v configured to target storage controller c. Using rmax and wmax from EQUATIONS 26 and 28, performance utilization of the storage controller c by virtual machine v is calculated according EQUATIONS 30-32.

$$U_v = \frac{I_v(c)}{rmax + wmax} \tag{30}$$

$$W_v = \frac{U_v}{\sum_{v=v0}^{vn} U_v} \tag{31}$$

$$U_v(c) = W_v * U_c \tag{32}$$

The term Iv(c) indicates total IOPS of virtual machine v for storage controller c. The term Wv is a weight of virtual machine v, which specifies a contribution of workload of storage controller attributed to virtual machine v.

A performance utilization value for a storage controller that is attributed to a virtual machine (virtual machine storage resource performance utilization) is calculated according to EQUATIONS 33-42. Virtual machine storage resource performance utilization is calculated for a given virtual machine v accessing a storage resource s residing at storage controller c.

In one embodiment, a virtual machine storage resource performance utilization Uv(s) indicates a portion of virtual machine performance utilization relative to a given storage resource. In such an embodiment, a total IOPS value Iv(s) for the virtual machine v accessing storage resource s is used to calculate peak read and write IOPS values. In one embodiment a specific workload profile is available for virtual machine v, and rmax and wmax are calculated according to EQUATIONS 33-36. EQUATION 33 operates similarly to EQUATION 1 to calculate a peak read IOPS value and EQUATION 35 operates similarly to EQUATION 3 to calculate a peak write IOPS value. EQUATION 34 is calculated as an IOPS value for read requests of size n for virtual machine v targeting storage resource s, divided by total IOPS for virtual machine v targeting storage resource s. Similarly, EQUATION 36 is calculated as an IOPS value for write requests of size n for virtual machine v targeting storage resource s, divided by total IOPS for virtual machine v targeting storage resource s.

$$rmax = \sum_{n=4K}^{2M} r(n) * rmax(n) \; \forall \; n = [4K \ldots 2M] \quad (33)$$

$$r(n) = \frac{Iv(s)(r)(n)}{Iv(s)} \quad (34)$$

$$wmax = \sum_{n=4K}^{2M} w(n) * wmax(n) \; \forall \; n = [4K \ldots 2M] \quad (35)$$

$$w(n) = \frac{Iv(s)(w)(n)}{Iv(s)} \quad (36)$$

In an alternative embodiment, a workload profile is not available for virtual machine v, and an average I/O request block size for the virtual machine accessing storage resource s is used to calculate rmax and wmax, according to EQUATIONS 37-40.

$$rmax = r * rmax(rb) \quad (37)$$

$$r = \frac{Iv(s)(r)}{Iv(s)} \quad (38)$$

$$wmax = w * wmax(wb) \quad (39)$$

$$w = \frac{Iv(s)(w)}{Iv(s)} \quad (40)$$

The terms rb and wb represent respective average read and write I/O request block sizes generated by virtual machine v that target storage resource s. Using rmax and wmax from EQUATIONS 37 and 39, virtual machine storage resource performance utilization Uv(s) is calculated according EQUATIONS 41-42 for storage resource s and virtual machine v.

$$U_v(s) = \frac{I_v(s)}{rmax + wmax} \quad (41)$$

$$W_v = \frac{U_v}{\sum_{v=v0}^{m} U_v} \quad (42)$$

Techniques for estimating performance utilization are discussed with reference to EQUATIONS 1-42 in the context of one or more storage controllers. In various embodiments, these techniques are employed to estimate performance utilization of storage controllers in candidate placement configurations of storage resources in the storage controllers. In one embodiment, an estimated performance utilization value is used to initiate a management action of performing a storage resource migration from one storage controller to another storage controller. Selecting a new placement configuration of storage resources is performed by evaluating one or more candidate placement configurations using the present techniques for estimating performance utilization values. In another embodiment, estimated performance utilization is used to select a new placement configuration when directing a system management action of adding a new storage resource to an existing set of storage resources. Again, selecting a new placement configuration of storage resources is performed by evaluating one or more candidate placement configurations using the present techniques for estimating performance utilization values. In one embodiment, the new placement configuration includes a new storage resource assigned to a storage controller. In another embodiment, the storage resource was previously provisioned and the storage resource is migrated to the storage controller. Otherwise, if the storage resource was not previously provisioned, then the storage resource is provisioned on the storage controller.

Figure 4C:
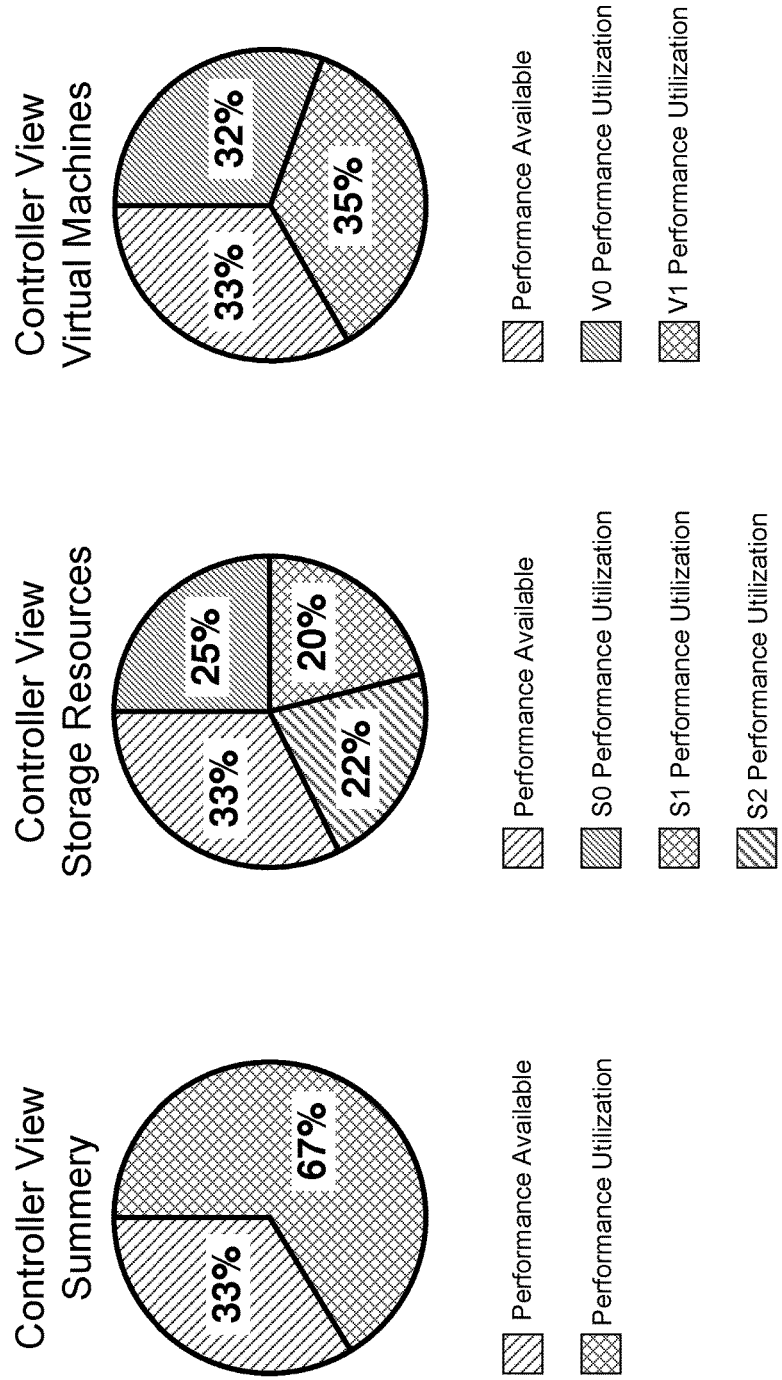
FIG. 4C is a set of exemplary pie charts for displaying a storage controller view of relative performance utilization, according to some embodiments.

FIG. 4C is a set of exemplary pie charts for displaying a storage controller view of relative performance utilization, according to some embodiments. These exemplary pie charts depict different performance utilization calculations for a given storage controller. For example, the left most pie chart titled "controller view summary" depicts performance utilization for the storage controller, indicating overall storage controller performance utilization to be sixty-seven percent, with thirty-three percent remaining available. The overall storage controller performance utilization value can be calculated according to EQUATIONS 1-14.

The middle pie chart depicts different storage resource performance utilization values for different storage resources of the storage controller. As shown, three different storage resources (S0, S1, S2) consume twenty-five percent, twenty percent, and twenty-two percent of performance utilization for the storage controller, respectively, with thirty-three percent remaining available. Storage resource performance utilization for the different storage resources can be calculated according to EQUATIONS 15-21.

The right most pie chart depicts different virtual machine performance utilization values for by two different virtual machines. (V0, V1). The virtual machine performance utilization values can be calculated according to EQUATIONS 22-32.

These and other performance utilization values can be depicted in graphical form in various embodiments, so as to report performance utilization and/or depict ranking of different storage resources, different storage clients, and the like.

FIG. 5 is a flow chart of a method 500 for directing a system management action using a performance utilization estimate for a destination storage controller, according to some embodiments. Although method 500 is described in conjunction with the systems of FIGS. 1 and 2, any computation system that performs method 500 is within the scope and spirit of embodiments of the techniques disclosed herein. In one embodiment, a storage resource manager, such as storage resource manager 115A, 115B, or 115C of FIG. 1 is configured to perform method 500. Programming instructions for performing method 500 are stored in a non-transitory computer readable storage medium and executed by a processing unit. In one embodiment, the programming instructions comprise a computer program product.

In one embodiment, method 500 is performed to add a storage resource to a destination storage controller. If performance utilization for the destination storage controller is calculated to be below a predetermined threshold value, assuming the addition of the storage resource, then the storage resource manager directs a system management action to add the storage resource to the destination storage controller.

A given placement configuration specifies placements of different storage resources at different storage controllers. A candidate placement configuration can specify potentially new storage resources added to different destination storage controllers. An arbitrary number of new storage resources can be specified within a placement configuration. However, for clarity, method 500 is described generally with respect to one storage resource being added to the destination storage controller, according to a selected candidate placement configuration.

Method 500 proceeds upon the storage resource manager detecting an action trigger event to add the storage resource to the destination storage controller. The storage resource can be added as a newly provisioned storage resource or an existing storage resource that is migrated to the destination storage controller.

At step 510, the storage resource manager generates a performance profile for the destination storage controller. In one embodiment, peak IOPS values for the performance profile are measured separately and provided to the storage resource manager. For example, the peak IOPS values can be measured by a manufacturer of the destination storage controller and provided for the destination storage controller (e.g., as a data file). In another embodiment, peak IOPS values for the performance profile are measured by the storage resource manager (either directly or indirectly). Peak IOPS values for different valid read and write I/O request block sizes are included in the performance profile. The performance profile can be represented in any technically feasible form, such as a data file comprising numeric values, an array of numeric values, a data packet of numeric values, and the like.

At step 520, the storage resource manager generates a workload profile for the destination storage controller. In one embodiment, the storage resource manager receives raw usage statistics data from the destination storage controller while the destination storage controller is servicing respective workloads. In certain embodiments, the destination storage controller maintains a set of counters, configured to separately record the number of read requests for each valid I/O request block size, and the number of write requests for each valid I/O request block size. In such an embodiment, generating the workload profile comprises accumulating counts for each valid read I/O request block size received and each valid write I/O request block size received. The different counts (e.g., raw usage statistics data) are transmitted to the storage resource manager, which then generates the workload profile for the destination storage controller. In one embodiment, accumulated counts for each different read and write I/O request block size are normalized and the workload profile comprises corresponding normalized values. In certain embodiments, the workload profile further includes a measured workload contribution for the storage resource or an estimated workload contribution for the storage resource. In other embodiments, the workload contribution for the storage resource at the destination storage controller is estimated as an additional utilization value for the destination storage controller.

At step 530, the storage resource manager calculates a performance utilization value for the destination storage controller according to the performance profile for the destination storage controller and the workload profile for the destination storage controller. The performance utilization value is calculated as though the storage resource is residing at the destination storage controller to determine that adding the storage resource does not exceed the predefined threshold for the destination storage controller. In certain embodiments the performance utilization value is calculated according to one or more of EQUATIONS 1-42.

At step 550, the storage resource manager selects a new placement configuration in response to determining that adding the storage resource to the destination storage controller does not exceed the predefined threshold. The new placement configuration specifies a new assignment of the storage resource to the destination storage controller such that the destination storage controller performance utilization is calculated to not exceed the predetermined threshold. Implementing the new placement configuration can include migrating the storage resource to the destination storage controller or provisioning a new storage resource at the destination storage controller.

At step 560, the storage resource manager directs a system management action to add the storage resource to the destination storage controller, according to the new placement configuration. In one embodiment, the system management action comprises migrating the storage resource to the destination storage controller. Any technique known in the art may be executed to migrate the storage resource. In another embodiment, the system management action comprises provisioning a new storage resource at the destination storage controller, according to the new placement configuration.

Figure 6:
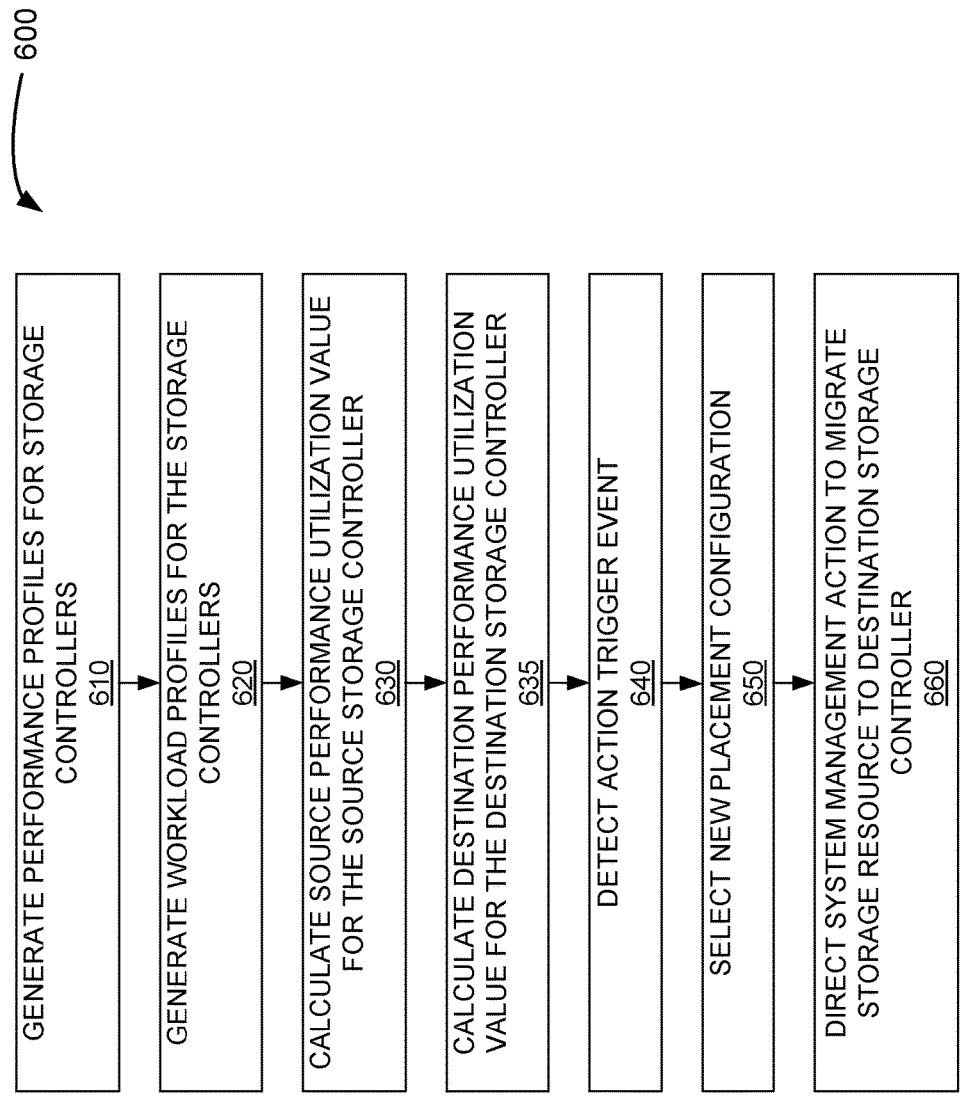
FIG. 6 is a flow chart of a method for directing a system management action using performance utilization estimates for a source storage controller and a destination storage controller, according to some embodiments.

FIG. 6 is a flow chart of a method 600 for directing a system management action using performance utilization estimates for a source storage controller and a destination storage controller, according to some embodiments. Although method 600 is described in conjunction with the systems of FIGS. 1 and 2, any computation system that performs method 600 is within the scope and spirit of embodiments of the techniques disclosed herein. In one embodiment, a storage resource manager, such as storage resource manager 115A, 115B, or 115C of FIG. 1 is configured to perform method 600. Programming instructions for performing method 600 are stored in a non-transitory computer readable storage medium and executed by a processing unit. In one embodiment, the programming instructions comprise a computer program product.

A given placement configuration specifies placements of different storage resources at different storage controllers. More specifically, the placement configuration specifies a source storage controller where a given storage resource resides. The placement configuration can further specify the destination storage controller. The destination storage controller is where the storage resource will be moved upon performing a system management action of migrating the storage resource. For clarity, method 600 is described generally with respect to one storage resource, the source storage controller, and the destination storage controller.

In one embodiment, method 600 is performed to identify a destination storage controller for the storage resource residing at the source storage controller. In certain embodiments, method 600 is performed at periodic time intervals (e.g., every hour, every day, etc.). If, during the course performing method 600, the storage resource manager calculates that performance utilization for the source storage controller is above a threshold value, then an action trigger event is detected, causing the storage resource manager to select a new placement configuration that specifies the destination storage controller. Upon selecting the new placement configuration, the storage resource manager then directs a system management action to migrate the storage resource from the source storage controller to the destination storage.

In another embodiment, steps 610 through 630 of method 600 are performed to calculate and report current performance utilization for the storage resource. In yet another embodiment, steps 610 through 630 are performed to calculate and report predicted performance utilization of the source storage controller and/or the destination storage controller assuming the storage resource can be migrated from the source storage controller to the destination storage controller. In certain embodiments, the steps are performed at periodic time intervals to provide periodic reports.

At step 610, the storage resource manager generates performance profiles for the source and destination storage controllers. More specifically, the storage resource manager generates a source performance profile for the source storage controller and a destination performance profile for the destination storage controller. In one embodiment, peak IOPS values for the source performance profile and the destination performance profile are measured separately and provided to the storage resource manager. For example, the peak IOPS values for the source and destination storage controllers can be measured by a manufacturer and provided with the storage controllers (e.g., as data files). In another embodiment, peak IOPS values for a given performance profile are measured by the storage resource manager (either directly or indirectly). Peak IOPS values for different valid read and write I/O request block sizes are included in the source performance profile and destination performance profile. The performance profiles can be represented in any technically feasible form, such as data files comprising numeric values, arrays of numeric values, data packets of numeric values, and the like.

At step 620, the storage resource manager generates a source workload profile for the source storage controller and a destination workload profile for the destination storage controller. In one embodiment, the storage resource manager receives raw usage statistics data from the source storage controller and the destination storage controller while the storage controllers are servicing respective workloads. The storage resource manager then generates the source workload profile to reflect relative write and read I/O request block size contributions for the source storage controller, and generates the destination workload profile to reflect relative write and read I/O request block size contributions for the destination storage controller.

At step 630, the storage resource manager calculates a source performance utilization value for the source storage controller using the source performance profile and the source workload profile for the source storage controller. In certain embodiments the source performance utilization value is calculated according to one or more of EQUATIONS 1-42.

At step 635, the storage resource manager calculates a destination performance utilization value for the destination storage controller using the destination performance profile and the destination workload profile for the destination storage controller. The destination performance utilization value is calculated assuming the storage resource has been added to the destination storage controller. In certain embodiments the destination performance utilization value is calculated according to one or more of EQUATIONS 1-42.

At step 640, the storage resource manager detects an action trigger event. In one embodiment, the action trigger event comprises determining that the source performance utilization value (e.g., as calculated at step 630) is above a predetermined threshold (e.g., ninety percent). In various embodiments, the source performance utilization value and/or performance utilization threshold apply with respect to overall performance utilization of the source storage controller, a storage resource accessible through the source storage controller, a virtual machine initiating requests that target the source storage controller, or a combination thereof. In another embodiment, the action trigger event comprises determining that at least one storage resource meets conditions to be migrated from the source storage controller to the destination storage controller. Such conditions include, without limitation, determining that a storage resource exhibits relatively low performance utilization (storage resource is "cold") and can be migrated to the destination storage controller (along with other low performance utilization storage resources), determining that a storage resource exhibits relatively high performance utilization (storage resource is "hot") and can be migrated to the destination storage controller (with relatively low utilization prior to migration).

In other embodiments, overlap analysis is performed, whereby different storage resources on the source storage controller are organized into sets of complementing and competing objects. Competing storage resources typically have significant time overlapped access patterns of the same type (read or write). Determining that competing storage resources are accessed through the source storage controller causes detection of an action trigger event. In one embodiment, when storage resources are determined to be competing, a new placement configuration is selected that migrates one or more of the competing storage resources to the destination storage controller. The migration operation is performed at step 660.

In certain embodiments, clustering statistics are gathered over long periods of time (e.g., hours, days, months). When the clustering statistics indicate that the storage controller exhibits an overload condition, even transiently, the storage controller is likely at risk of being subsequently overloaded. An overload condition in this context causes an action trigger event to be detected. The action trigger event identifies the storage resource for migration from the source storage controller to the destination storage controller. A new placement configuration including the migration operation is implemented in step 660.

At step 650, the storage resource manager selects a new placement configuration from one or more candidate placement configurations in response to detecting the action trigger event. The selection is performed using the destination performance utilization value to determine that the destination storage controller will not exceed the predefined threshold, assuming the storage resource has been added to the destination storage controller. In one embodiment, different candidate placement configurations are evaluated with respect to storage controller performance utilization and an acceptable new placement configuration avoids overloading different storage controllers identified within the placement configuration. In this context, a selected new placement configuration specifies the storage resource is migrated from the source storage controller to the destination storage controller, with resulting source performance utilization and destination performance utilization predicted to be below the predefined threshold.

At step 660, the storage resource manager directs a system management action to migrate the storage resource to the destination storage controller, in accordance with the new placement configuration. Any technique known in the art may be performed to migrate the storage resource.

In certain embodiments, method 600 further includes reporting performance utilization to depict ranking of different storage resources, such as storage resources associated with listed virtual machines. Time of day usage can also be graphed or otherwise reported. Performance usage can be reported using text descriptions, graphical depictions, web-based APIs, one or more web pages or web interfaces, and through database entries, or any combination thereof. For example, reporting may be performed through a webpage that renders graphical charts, such as pie charts (e.g., as depicted in FIG. 4C) or bar charts. In one embodiment, the graphical chats depict relative performance utilization of different storage resources relative to each other or relative to their storage controller.

In summary, techniques for improving system operation are disclosed that use performance utilization values calculated from storage controller performance profiles in conjunction with workload profiles. The performance utilization values can be used to predict that a candidate placement configuration will avoid overload conditions with respect to storage controllers. A candidate placement configuration can be evaluated and selected for newly added storage resources or for migrating an existing storage resource to a destination storage system for better system operation (e.g., eliminating an overload condition or risk of overload condition).

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:

generating by a storage resource manager a performance profile for a destination storage controller, wherein the performance profile comprises peak read input/output operations per second (IOPS) values for at least two different read input/output (I/O) request block sizes and peak write IOPS values for at least two different write I/O request block sizes;

generating by the storage resource manager a workload profile for the destination storage controller, wherein the workload profile comprises contribution values for each of the at least two different read I/O request block sizes and contribution values for each of the at least two different write I/O request block sizes;

calculating by the storage resource manager a performance utilization value for the destination storage controller using the performance profile and the workload profile;

selecting by the storage resource manager a new placement configuration for a storage resource using the performance utilization value, wherein the new placement specifies adding the storage resource to the destination storage controller; and directing by the storage resource manager, in response to selecting the new placement configuration, the destination storage controller to perform a system management action to add the storage resource to the destination storage controller, wherein calculating the performance utilization value for the destination storage controller comprises:

calculating a peak total read IOPS value according to a sum of products, wherein each product is calculated by multiplying a peak read IOPS value for each of the at least two different read I/O request block sizes by a corresponding ratio, wherein the ratio is calculated by dividing a read contribution value for the I/O request block size by a sum of read contribution values summed over a set of read I/O request block sizes;

calculating a peak total write IOPS value according to a sum of products, wherein each product is calculated by multiplying a peak write IOPS value for each of the at least two different write I/O request block sizes by a corresponding ratio, wherein the ratio is calculated by dividing a write contribution value for the I/O request block size by a sum of write contribution values summed over a set of write I/O request block sizes;

assigning a peak net IOPS value to be either a sum of the peak total read IOPS value and the peak total write IOPS value, or a weighted minimum of the peak total read IOPS value and the peak total write IOPS value; and calculating a ratio of total IOPS at the destination storage controller and the peak net IOPS value.

2. The method of claim 1, wherein the set of read I/O request block sizes comprises each valid read I/O request block size for the destination storage controller and the set of write I/O request block sizes comprises each valid write I/O request block size for the destination storage controller.

3. The method of claim 1, wherein the set of read I/O request block sizes comprises one read I/O request block size and the set of write I/O request block sizes comprises one write I/O request block size.

4. The method of claim 1, wherein the at least two different read I/O request block sizes comprise at least a four kilobyte I/O request block size and an eight kilobyte I/O request block size, and the at least two different write I/O request block sizes comprise at least a four kilobyte I/O request block size and an eight kilobyte I/O request block size.

5. An apparatus, comprising:
a computing system coupled to a storage controller, the computing system configured to:
generate by a storage resource manager a performance profile for a destination storage controller, wherein the performance profile comprises peak read input/output operations per second (IOPS) values for at least two different read input/output (I/O) request block sizes and peak write IOPS values for at least two different write I/O request block sizes;
generate by the storage resource manager a workload profile for the destination storage controller, wherein the workload profile comprises contribution values for each of the at least two different read I/O request block sizes and contribution values for each of the at least two different write I/O request block sizes;
calculate by the storage resource manager a performance utilization value for the destination storage controller using the performance profile and the workload profile;
select by the storage resource manager a new placement configuration for a storage resource using the performance utilization value, wherein the new placement specifies adding the storage resource to the destination storage controller; and
direct by the storage resource manager, in response to selecting the new placement configuration, the destination storage controller to perform a system management action to add the storage resource to the destination storage controller,
wherein to calculate the performance utilization value for the storage controller, the computing system is configured to:
calculate a peak total read IOPS value according to a sum of products, wherein each product is calculated by multiplying a peak read IOPS value for each of the at least two different read I/O request block sizes by a corresponding ratio, wherein the ratio is calculated by dividing a read contribution value for the I/O request block size by a sum of read contribution values summed over a set of read I/O request block sizes;
calculate a peak total write IOPS value according to a sum of products, wherein each product is calculated by multiplying a peak write IOPS value for each of the at least two different write I/O request block sizes by a corresponding ratio, wherein the ratio is calculated by dividing a write contribution value for the I/O request block size by a sum of write contribution values summed over a set of write I/O request block sizes;
assign a peak net IOPS value to be either a sum of the peak total read IOPS value and the peak total write IOPS value, or a weighted minimum of the peak total read IOPS value and the peak total write IOPS value; and
calculate a ratio of total IOPS at the storage controller and the peak net IOPS value.

6. The apparatus of claim 5, wherein the set of read I/O request block sizes comprises each valid read I/O request block size for the destination storage controller and the set of write I/O request block sizes comprises each valid write I/O request block size for the destination storage controller.

7. The apparatus of claim 5, wherein the set of read I/O request block sizes comprises one read I/O request block size and the set of write I/O request block sizes comprises one write I/O request block size.

8. The apparatus of claim 5, wherein the at least two different read I/O request block sizes comprise at least a four kilobyte I/O request block size and an eight kilobyte I/O request block size, and the at least two different write I/O request block sizes comprise at least a four kilobyte I/O request block size and an eight kilobyte I/O request block size.

9. A method comprising:
generating by a storage resource manager a source performance profile for a source storage controller, wherein the source performance profile comprises source peak read input/output operations per second (IOPS) values for at least two different read input/output (I/O) request block sizes for the source storage controller and source peak write IOPS values for at least two different write I/O request block sizes for the source storage controller;
generating by a storage resource manager a destination performance profile for a destination storage controller, wherein the destination performance profile comprises destination peak read IOPS values for at least two different read input/output (I/O) request block sizes for the destination storage controller and destination peak write IOPS values for at least two different write I/O request block sizes for the destination storage controller;
generating by the storage resource manager a source workload profile for the source storage controller, wherein the source workload profile comprises contribution values for each of the at least two different read I/O request block sizes for the source storage controller and contribution values for each of the at least two different write I/O request block sizes for the source storage controller;
generating by the storage resource manager a destination workload profile for the destination storage controller, wherein the destination workload profile comprises contribution values for each of the at least two different read I/O request block sizes for the destination storage controller and contribution values for each of the at least two different write I/O request block sizes for the destination storage controller;
calculating by the storage resource manager a source performance utilization value for the source storage controller using the source performance profile and the source workload profile; and calculating by the storage resource manager a destination performance utilization value for the destination storage controller using the destination performance profile and the destination workload profile,
wherein calculating the source performance utilization value for the source storage controller comprises:
calculating a source peak total read IOPS value according to a first sum of products, wherein each product is calculated by multiplying a source peak read IOPS value for each of the at least two different read I/O request block sizes by a first corresponding ratio, wherein the first ratio is calculated by dividing a source read contribution value for the I/O request block size by a first sum of read contribution values summed over a first set of read I/O request block sizes;
calculating a source peak total write IOPS value according to a second sum of products, wherein each product is calculated by multiplying a source peak write IOPS value for each of the at least two different write I/O request block sizes by a second corresponding ratio, wherein the second ratio is calculated by dividing a source write contribution value for the I/O request block size by a first sum of write contribution values summed over a first set of write I/O request block sizes;
assigning a source peak net IOPS value to be either a sum of the source peak total read IOPS value and the source peak total write IOPS value, or a first weighted minimum of the source peak total read IOPS value and the source peak total write IOPS value; and
calculating a first ratio of total IOPS at the source storage controller and the source peak net IOPS value.

10. The method of claim 9, further comprising:
detecting by the storage resource manager an action trigger event using the source performance utilization value;
selecting by the storage resource manager a new placement configuration for a storage resource using the destination performance utilization value, wherein the new placement specifies adding the storage resource to the destination storage controller, and wherein the destination performance utilization value is determined to not exceed a predetermined threshold for the destination storage controller; and
directing by the storage resource manager, in response to selecting the new placement configuration, the destination storage controller to perform a system management action to add the storage resource to the destination storage controller.

11. The method of claim 9, wherein calculating the destination performance utilization value for the destination storage controller comprises:
calculating a destination peak total read IOPS value according to a third sum of products, wherein each product is calculated by multiplying a destination peak read IOPS value for each of the at least two different read I/O request block sizes by a third corresponding ratio, wherein the third ratio is calculated by dividing a second read contribution value for the I/O request block size by a second sum of read contribution values summed over a second set of read I/O request block sizes;
calculating a destination peak total write IOPS value according to a fourth sum of products, wherein each product is calculated by multiplying a destination peak write IOPS value for each of the at least two different write I/O request block sizes by a fourth corresponding ratio, wherein the fourth ratio is calculated by dividing a second write contribution value for the I/O request block size by a second sum of write contribution values summed over a second set of write I/O request block sizes;
assigning a destination peak net IOPS value to be either a sum of the destination peak total read IOPS value and the destination peak total write IOPS value, or a second weighted minimum of the destination peak total read IOPS value and the second peak total write IOPS value; and
calculating a second ratio of total IOPS at the destination storage controller and the destination peak net IOPS value.

12. The method of claim 9, wherein the first set of read I/O request block sizes comprises each valid read I/O request block size for the destination storage controller and the first set of write I/O request block sizes comprises each valid write I/O request block size for the destination storage controller.

13. The method of claim 9, wherein the first set of read I/O request block sizes comprises one read I/O request block size and the first set of write I/O request block sizes comprises one write I/O request block size.

14. The method of claim 9, wherein the at least two different read I/O request block sizes comprise at least a four kilobyte I/O request block size and an eight kilobyte I/O request block size, and the at least two different write I/O request block sizes comprise at least a four kilobyte I/O request block size and an eight kilobyte I/O request block size.

15. The method of claim 10, wherein detecting comprises determining that the source performance utilization value is larger than a predefined threshold.

16. The method of claim 10, wherein detecting comprises determining that the storage resource is cold.

17. The method of claim 9, further comprising reporting the source performance utilization value.

18. An apparatus, comprising:
a computing system coupled to a storage controller, the computing system configured to:
generate by a storage resource manager a source performance profile for a source storage controller, wherein the source performance profile comprises source peak read input/output operations per second (IOPS) values for at least two different read input/output (I/O) request block sizes for the source storage controller and source peak write IOPS values for at least two different write I/O request block sizes for the source storage controller;
generate by a storage resource manager a destination performance profile for a destination storage controller, wherein the destination performance profile comprises destination peak read IOPS values for at least two different read input/output (I/O) request block sizes for the destination storage controller and destination peak write IOPS values for at least two different write I/O request block sizes for the destination storage controller;
generate by the storage resource manager a source workload profile for the source storage controller, wherein the source workload profile comprises contribution values for each of the at least two different read I/O request block sizes for the source storage controller and contribution values for each of the at least two different write I/O request block sizes for the source storage controller;

generate by the storage resource manager a destination workload profile for the destination storage controller, wherein the destination workload profile comprises contribution values for each of the at least two different read I/O request block sizes for the destination storage controller and contribution values for each of the at least two different write I/O request block sizes for the destination storage controller;

calculate by the storage resource manager a source performance utilization value for the source storage controller using the source performance profile and the source workload profile;

calculate by the storage resource manager a destination performance utilization value for the destination storage controller using the destination performance profile and the destination workload profile;

detect by the storage resource manager an action trigger event using the source performance utilization value;

select by the storage resource manager a new placement configuration for a storage resource using the destination performance utilization value, wherein the new placement specifies adding the storage resource to the destination storage controller, and wherein the destination performance utilization value is determined to not exceed a predetermined threshold for the destination storage controller; and direct by the storage resource manager, in response to selecting the new placement configuration, the destination storage controller to perform a system management action to add the storage resource to the destination storage controller, wherein to calculate the source performance utilization value for the source storage controller, the computing system is configured to:
calculate a source peak total read IOPS value according to a first sum of products, wherein each product is calculated by multiplying a source peak read IOPS value for each of the at least two different read I/O request block sizes by a first corresponding ratio, wherein the first ratio is calculated by dividing a source read contribution value for the I/O request block size by a first sum of read contribution values summed over a first set of read I/O request block sizes;

calculate a source peak total write IOPS value according to a second sum of products, wherein each product is calculated by multiplying a source peak write IOPS value for each of the at least two different write I/O request block sizes by a second corresponding ratio, wherein the second ratio is calculated by dividing a source write contribution value for the I/O request block size by a first sum of write contribution values summed over a first set of write I/O request block sizes;

assign a source peak net IOPS value to be either a sum of the source peak total read IOPS value and the source peak total write IOPS value, or a first weighted minimum of the source peak total read IOPS value and the source peak total write IOPS value; and calculate a first ratio of total IOPS at the source storage controller and the source peak net IOPS value.

19. The apparatus of claim 18, wherein to calculate the destination performance utilization value for the destination storage controller, the computing system is configured to:
calculate a destination peak total read IOPS value according to a third sum of products, wherein each product is calculated by multiplying a destination peak read IOPS value for each of the at least two different read I/O request block sizes by a third corresponding ratio, wherein the third ratio is calculated by dividing a second read contribution value for the I/O request block size by a second sum of read contribution values summed over a second set of read I/O request block sizes;

calculate a destination peak total write IOPS value according to a fourth sum of products, wherein each product is calculated by multiplying a destination peak write IOPS value for each of the at least two different write I/O request block sizes by a fourth corresponding ratio, wherein the fourth ratio is calculated by dividing a second write contribution value for the I/O request block size by a second sum of write contribution values summed over a second set of write I/O request block sizes;

assign a destination peak net IOPS value to be either a sum of the destination peak total read IOPS value and the destination peak total write IOPS value, or a second weighted minimum of the destination peak total read IOPS value and the second peak total write IOPS value; and calculate a second ratio of total IOPS at the destination storage controller and the destination peak net IOPS value.

20. The apparatus of claim 18, wherein detecting comprising determining that source performance utilization value is larger than a predefined threshold or determining that the storage resource is cold.

* * * * *